United States Patent Office 3,456,634
Patented July 22, 1969

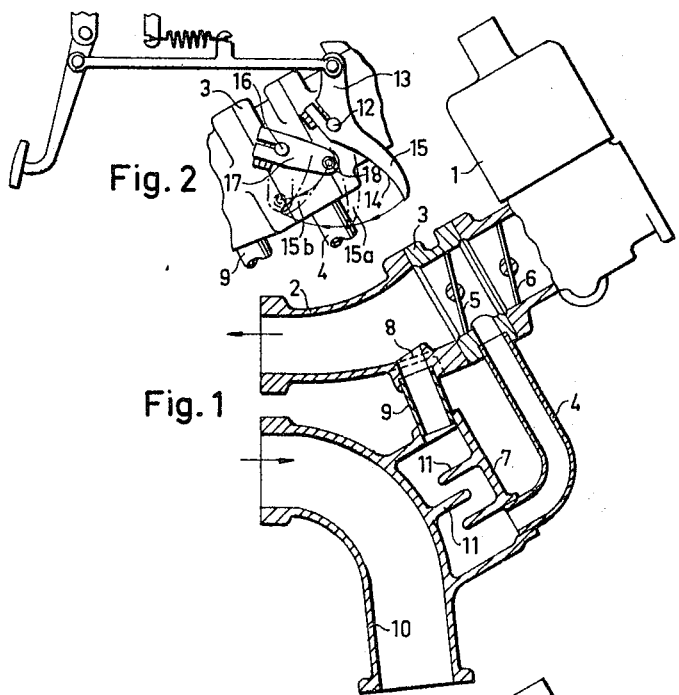

3,456,634
DEVICE FOR PREHEATING THE FUEL-AIR MIXTURE IN CARBURETOR ENGINES
Gösta Ingemar Nelson, Gothenburg, Sweden, assignor to Aktiebolaget Volvo, a Swedish body-corporate
Continuation-in-part of application Ser. No. 597,583, Nov. 29, 1966. This application July 24, 1967, Ser. No. 655,432
Claims priority, application Sweden, Dec. 1, 1965, 15,548/65
Int. Cl. F02m 31/14; F02d 39/02
U.S. Cl. 123—122                    1 Claim

ABSTRACT OF THE DISCLOSURE

The intake manifold system of a carburetor engine is provided with two throttles, one behind the other, and a branch pipe leading from the manifold to a heating member and back to said manifold, one of the throttles being disposed between the inlet and outlet ends of the branch pipe, said one throttle being closed at low engine output thereby compelling all of the fuel-air mixture to flow through said branch pipe whereas at high output said throttle permits controllable flow directly into the engine, the other throttle being adapted at low output to control the flow through the branch pipe and at high output to be fully or substantially fully open and the other throttle also including a spring-loaded valve which opens in the direction of the intake manifold to establish a communication between the intake manifold and the carburetor and thereby reduce the subpressure in the intake manifold when the throttle is closed during motor brake.

---

The present invention relates to an intake manifold system of a carburetor engine. This application is a continuation-in-part of my application Ser. No. 597,583, filed Nov. 29, 1966 but now abandoned.

In common with said application the object of the present invention is to arrange an intake system of a carburetor engine in such a manner that the content of noxious gases in the exhaust gases will be substantially reduced, whereas normal high output is obtained.

In carburetor engines especially used in cars attempts have been made to evaporate the fuel-air mixture to such an extent that a combustion as complete as possible is obtained. To this end the intake manifold or part thereof has been heated in various ways in order to evaporate separated fuel drops. Constructions are known in which parts of the exhaust manifold and intake manifold are integrally cast with the result that a more or less long portion of the intake manifold will be heated by the exhaust gases. The intensity of heating can be controlled to a certain degree by diverting part of the exhaust gases from the hot spot. Since the heating cannot be discontinued the volumetric efficiency is low within the whole range of load with the result that the engine cannot develop the calculated maximum output.

A principal object of this invention is to provide an improved device for pre-heating the fuel-air mixture so that at idling and low output of the engine the fuel-air mixture will be subjected to a high degree of perheating and turbulence for evaporating the fuel as extensively as possible and providing a homogenous mixture resulting in a combustion as complete as possible, whereas normal high output is obtained under volumetrically favourable conditions.

Another object is to prevent backflow of exhaust gases from the cylinder of the engine into the intake manifold during motor brake of the car. Said backflow depends on the subpressure in the intake manifold and the difference of the pressure prevailing in the cylinder and the intake manifold, respectively. By diminishing said subpressure the backflow will be reduced and this is achieved by means of a valve provided in a throttle valve of the intake system or in the wall of the intake manifold. Said valve is springloaded and adapted at a certain subpressure in the intake manifold to let in air of atmospheric pressure into the intake manifold. Due to the reduced backflow of exhaust gases a reliable ignition of the fuel-air mixture in the cylinder will be achieved with the consequence of a small content of unburnt fuel in the exhaust gases.

Figure 4:
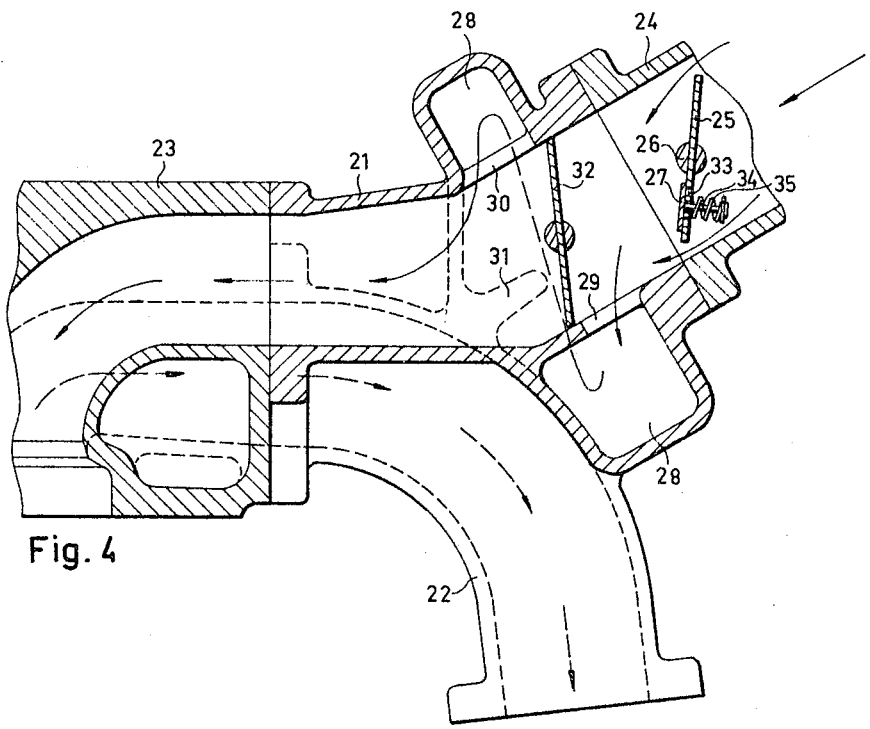
Figure 5:
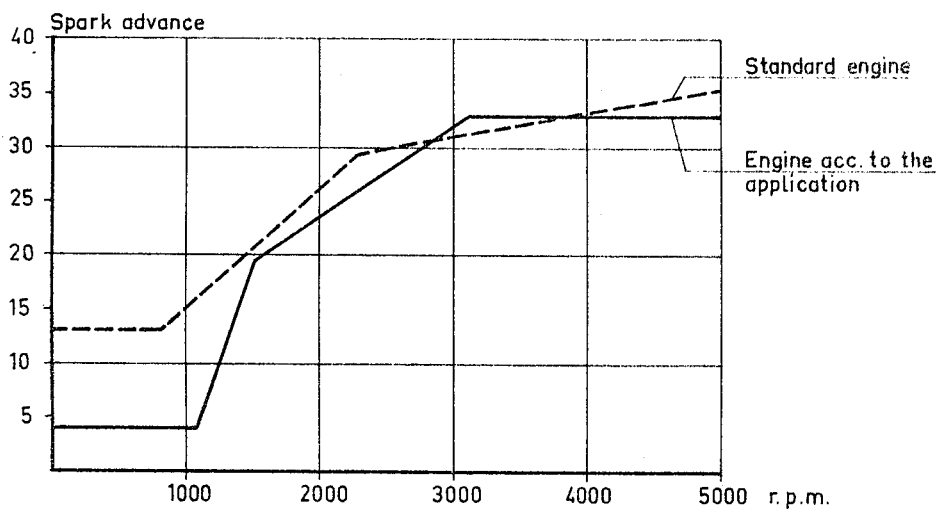

The invention will be described with reference to the accompanying drawings, in which FIG. 1 is a longitudinal sectional view of the intake manifold and outlet manifold of a carburetor engine, FIG. 2 is an elevation to a larger scale of a device for controlling the two throttle valves shown in FIG. 1, FIG. 3 is a sectional view similar to FIG. 1 of a different embodiment of the invention, FIG. 4 is a longitudinal sectional view of a practical embodiment of the arrangement shown in FIG. 1 and FIG. 5 is a diagram of timing of the pre-ignition of an engine with and without an arrangement according to the invention.

Referring to FIG. 1, a carburetor 1 communicates via a housing 3 with the inlet manifold 2 of an engine. The housing 3 communicates with the inlet end of a branch pipe 4 through which the fuel-air mixture from the carburetor 1 can be branched off. A turnable throttle valve 5 is disposed in the housing 3 between the inlet end of the pipe 4 and the inlet manifold 2. In the closed position of the throttle valve 5 the whole amount of the fuel-air mixture is compelled to flow through the pipe 4. Another throttle valve 6 is provided in the conventional manner in the outlet from the carburetor 1. The pipe 4 communicates with a chamber 7 which may be integral with or suitably secured to the exhaust manifold 10 so as to be effectively heated by the exhaust gases during operation of the engine. In order to intensify the heating and turbulence of the fuel-air mixture, projecting ribs 11 are provided in the path of flow so that the walls of the chamber 7 will be effectively swept by the mixture. A duct 9 leads from the chamber 7 to the inlet manifold 2. The outlet end 8 of the duct 9 is bevelled in order to improve the suction effect in the duct 9.

The mode of operation is as follows. With the engine idling and at low load the throttle valve 5 is closed and the required amount of fuel-air mixture is controlled by the throttle valve 6. Consequently, all of the mixture will be drawn into the branch pipe 4 and flow through the chamber 7 where it is intensively preheated and from which it passes through the duct 9 into the inlet manifold 2 and in the usual manner into the engine. If the throttle valve 6 is opened to an extent corresponding to the full capacity of the branch pipe 4, for instance if the throttle valve 6 has been turned through an angle of 30–40°, the throttle valve 5 will be gradually opened in accordance with the increasing output into a position corresponding to the maximum output, and at the same time the throttle valve 6 is turned until it leaves the passageway free for the fuel-air mixture. During that time a more and more increasing part of the fuel-air mixture will flow directly into the inlet manifold 2 with the result that the degree of preheating will become lower and lower so that the temperature of the mixture entering the engine will be low and the volumetric efficiency will be maintained at a high level. However, the branch pipe 4 and the chamber 7 should be ventilated even at high output among other things for preventing overheating of the chamber 7 and consequent risk of too high thermal stresses. For this reason the outlet end 8 of the duct 9 is bevelled in the direction of flow or otherwise suitably shaped so as to obtain a pressure differential between the inlet end of the pipe 4 and the outlet end of the duct 9. Due to this pressure differential a certain part of the fuel-air mixture will be drawn through the heating device even if the passage to the inlet manifold is free. The slight preheating of the mixture thus obtained has no significant effect on the volumetric efficiency at high load, but during acceleration an improved combustion can be obtained.

The two throttle valves 5 and 6 must of course be actuated by a common control, such as an accelerator pedal. FIG. 2 illustrates a suitable construction for this purpose. Secured to the spindle 12 of the throttle valve 6 is a lever 13 which by means of a linkage or wire is connected to a control. An arm 15 of the lever has a cam face 14. In the closed position of the throttle valve 6 the arm is in the position shown by full lines. Mounted on the spindle 16 of the throttle valve 5 is a lever 17 which at its end carries a roller 18. In the closed position of the throttle valve 5 the lever 17 is in the position shown by full lines.

In order to open the throttle valve 6 at low load, the lever 13 is turned clockwise. The lever 17 is not actuated until the arm 15 of the lever 13 has been turned into the position 15a shown by dotted lines in which the face 14 comes into contact with the roller 18. Upon continued turning of the lever 13 the lever 17 will also be moved and open the throttle valve 5 until both throttles are fully open in the position 15b. Since the roller 18 during the turning movement of the lever 17 is rolling along the cam face 14 at a gradually increasing distance from the spindle 12, the angular movement of the throttle valve 5 will be greater than the angular movement of the throttle valve 6 upon increasing opening movement of the throttle valve 6. Both throttles are spring biased to closed position.

The modification illustrated in FIG. 3 is distinguished from the device shown in FIG. 1 by the fact that the inlet end of the branch pipe 4 communicates with the outlet from the carburetor 1 upstream from the throttle valve 19 and that the outlet end 8 of the duct 9 from the heating chamber 7 communicates with the housing 3 upstream from the throttle valve 20 located in this housing. The mode of operation is the same as described above and the throttles are controlled as follows. With the engine idling and at low load the throttle valve 19 is closed and the whole amount of the fuel-air mixture passes through the branch pipe 4 and is controlled by means of the throttle valve 20 disposed in the housing 3. At higher output the throttle valve 19 is gradually opened and the throttle valve 20 is further opened until both throttles are fully open at full output. The throttles may be actuated in a manner similar to that described above.

In the practical embodiment shown in FIG. 4 the intake manifold 21 and the exhaust manifold 22 are integrally cast and in conventional manner fastened to the engine 23 by means of bolts. A carburetor 24 bolted to the intake manifold 21 has a throttle valve 25 secured to a spindle 26 and said throttle valve 25 is provided with a back valve member 27 with a purpose later described. Surrounding the intake manifold 21 is a heating chamber 28 having an inlet opening 29 and an outlet opening 30 both connected to the inner of the intake manifold, said heating chamber having part of the wall integral with the exhaust manifold 22, and the inner wall of said chamber is provided with projecting ribs 31 to intensify heating and turbulence of the fuel-air mixture flowing through the chamber. Disposed in the intake manifold between the inlet opening 29 and the outlet opening 30 is a turnable throttle valve 32 which in the closed position will compel the whole amount of fuel-air mixture from the carburetor 24 to flow through the heating chamber 28 but which throttle valve in open position controls the flow of fuel-air mixture directly through the intake manifold 21 from the carburetor 24 to the engine 23.

The mode of operation of the two throttle valves 25 and 32, respectively, is the same as described with reference to FIGS. 1 and 2. However, during motor brake of the car backflow of exhaust gases from the cylinder of the engine may occur due to the subpressure created in the intake manifold resulting in lag of ignition of the fuel-air mixture and unburnt fuel in the exhaust gases. In order to avoid said drawback the valve member 27 is mounted for automatical control of the pressure in the intake manifold. The throttle valve 25 has an annular opening 33 covered by the poppet valve member 27 on the side turned away from the carburetor 24, said valve member being provided with a stem 34 having its bearing in the throttle valve 25. A screw spring 35 surrounds said stem 34 and one end of the spring bears against a shoulder of the stem and the other end of which bears against the side of the throttle valve 25 turned toward the carburetor. The spring power is adjusted such that the poppet valve 27 will open at a predetermined subpressure in the intake manifold 21 in order to allow air of atmospheric pressure to enter into said manifold thereby increasing the pressure therein and simultaneously the exhaust gases from the engine will be diluted so that the amount of noxious gases will be reduced.

FIG. 5 is a diagram showing the timing of the ignition of an engine at various number of revolutions per minute with the device according to the invention and without said device, respectively.

The embodiments described may be varied within the scope of the invention. For instance, the throttle valve 6 or 20 which controls the flow through the heating device may be placed to the same effect either in the branch pipe 4 or in the duct 9. The movement of these throttle valves may be coupled and synchronized with the movement of the throttle valves 5 or 19, respectively, in the inlet manifold in a manner similar to that described with reference to the embodiment illustrated in FIGS. 1 and 2, but also other constructions are conceivable.

What I claim is:

1. In an intake system for fuel-air mixture of a carburetor engine having an unheated manifold and a heating member for said mixture, a branch pipe leading from said manifold to said heating member and therefrom back to said manifold, said heating member having means for effecting turbulence of the mixture flowing therethrough, two throttle valves in said manifold, one behind the other, one of said throttle valves being disposed between the inlet and outlet ends of said branch pipe and at low engine output closing said manifold thereby compelling the fuel-air mixture to flow through said heating member whereas at high output said throttle valve is turned and adapted to control the flow of mixture directly through the manifold, said other throttle valve at low output being turned for controlling the flow of mixture through said branch pipe and at high output held in substantially fully open position, and a spring-loaded valve provided in said other throttle valve, said valve being adapted to open under the influence of a high vacuum in the intake manifold thereby reducing said vacuum when said throttle valve is closed during motor brake.

(References on following page)

References Cited

UNITED STATES PATENTS

| | | |
|---|---|---|
| 1,767,031 | 6/1930 | Worthington. |
| 2,035,191 | 3/1936 | Reynolds. |
| 2,062,260 | 11/1936 | Weber _____ 261—65 X |
| 3,027,884 | 4/1962 | Bale et al. |
| 3,252,450 | 5/1966 | Dietrich et al. |
| 3,252,451 | 5/1966 | Sarto. |
| 3,289,659 | 12/1966 | Koole. |
| 3,338,568 | 8/1967 | Mangoletsi _____ 261—145 |
| 3,353,524 | 11/1967 | Sarto. |
| 3,356,083 | 12/1967 | Clark et al. |
| 3,373,725 | 3/1968 | Apaia _____ 123—97 X |

AL LAWRENCE SMITH, Primary Examiner

U.S. Cl. X.R.

123—75; 261—65